United States Patent [19]
Gibbon et al.

[11] 3,736,819
[45] June 5, 1973

[54] PARTING-OFF BOX FOR AUTOMATIC SCREW MACHINES

[76] Inventors: John D. Gibbon, 11922 Pavillion Street, Pierrefonds; Stanley McCarthy, 3499A 42nd Avenue, St. Michel, Quebec, both of Canada

[22] Filed: May 12, 1971

[21] Appl. No.: 142,536

[30] Foreign Application Priority Data

May 14, 1970  Great Britain.....................23,410/70

[52] U.S. Cl............................................82/2.5, 82/38
[51] Int. Cl. .............................................B23b 15/00
[58] Field of Search.............................82/38, 35, 2.5

[56] References Cited
UNITED STATES PATENTS 3,176,553  4/1965  Schubert..............................82/38 R
3,541,903  11/1970  Brinkman............................82/38 R

*Primary Examiner*—Leonidas Vlachos
*Attorney*—Young & Thompson

[57] ABSTRACT

The invention is particularly directed toward providing a device which can be used with a single-spindle, turret type, automatic screw machine to support the free end of the rotating article while the parting-off cut is being made. The device supports and rotates the article at the same speed as the machine for the entire parting-off cut so that the article will not separate from the rod when the cut is nearly completed.

4 Claims, 5 Drawing Figures

PARTING-OFF BOX FOR AUTOMATIC SCREW MACHINES

This invention relates to a parting-off box for automatic screw machines.

In the machining of articles in turret-type, single-spindle, automatic screw machines, it is standard practice to feed a rod intermittently through the center of rotation of a rod-holding member of the automatic machine. Between the feeding operations, several tooling operations are performed on the end of the length of material projecting from the rotating rod-holding member of the machine to form an article. The finished article is then cut off the end of the rod in a parting-off operation.

In the parting-off operation, the finished article is separated from the remaining length of the rod by a tool cutting transversely into and through the area joining the end of the article to the remaining length of the rod. The finished article is unsupported during this cutting operation and when the cut is nearly finished, the article will fall off from the end of the rod under its own weight. Since the article separates before the cut is completely finished, a slight projection of material remains on the end of the article. Thus a separate operation is required to remove this projection extending from the end of the finished workpiece to complete it.

The present invention is directed toward a piece of equipment designed to overcome this problem in separating a finished article from a length of rod material from which it is made in such a manner that no further finishing operation on the article is required. The parting-off or separation is clean so that there is no projection to remove in a further separate operation.

The invention is particularly directed toward providing a device which can be used with a single-spindle, turret-type, automatic screw machine to support the free end of the rotating article while the parting-off cut is being made. The device supports and rotates the article at the same speed as the machine for the entire parting-off cut so that the article will not separate from the rod when the cut is nearly completed.

Means are provided in the device for rotating the structure holding the free end of the article at the same speed of rotation as that of the rod rotated by the screw machine and for providing an unobstructed area in the device for allowing the parting-off cut to be made. The device can be easily mounted on the screw machine so that the structure holding the free end of the article can be rotated by the face of the collet cap of the screw machine through a drive train located in the device. The device is supported in the screw machine at one end by the turret which forces the opposite end of the device into frictional engagement with the face plate, closing a collet on the part to be cut off.

The invention will now be described in detail having reference to the accompanying drawings wherein.

Figure 1A:
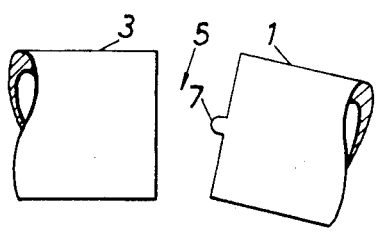
FIG. 1A illustrates the manner in which the article has previously separated from the rod length showing the projection formed thereon.

FIG. 1A illustrates what occurs when an article 1 is cut off from a rod length 3 in a parting-off operation without using the device of the present invention. The parting-off tool makes a cut 5 transversely to the rod to separate the finished article from the rod length. As the cut is nearly completed, the unsupported article, through its own weight, falls off before the cut is finished thus forming a projection 7 on the back face of the article. The projection must be removed, thus requiring a separate operation to completely finish the article being manufactured.

Figure 1B:
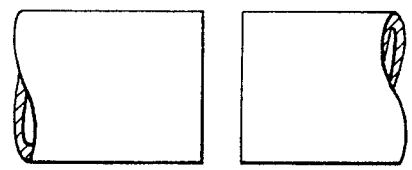
FIG. 1B illustrates the manner in which the article is separated from the rod length using the parting-off device of the present invention.
Figure 3:
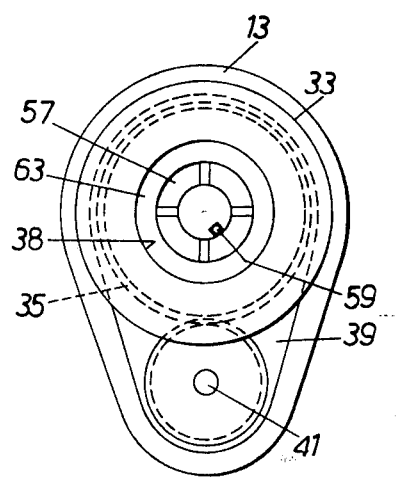
FIG. 3 is a side elevation view of the parting-off device.

As shown in FIG. 1B, using the device of the present invention permits the parting-off cut 5 to be made in such a manner that no projection is formed on the article separated from the rod. The device supports and revolves the article as the cut is made so that the article will not fall off near the end of the parting-off operation.

Figure 2:
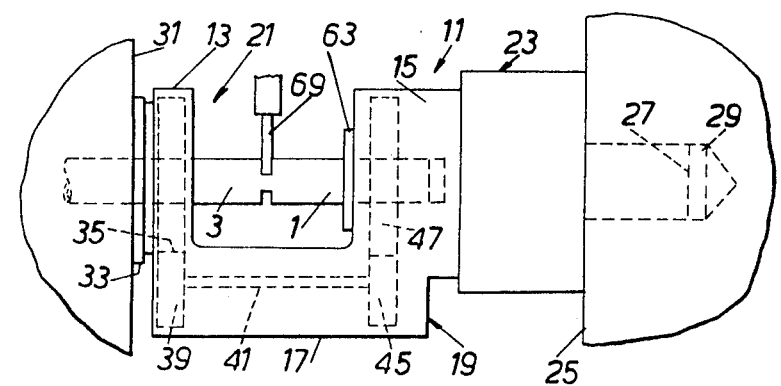
FIG. 2 is a front elevation view of the parting-off device showing it mounted in position between the face plate and the tailstock of the automatic screw machine with the rod length extending from the face plate and the article, still connected to the rod length, supported by the device.

As shown in FIG. 2, the parting-off box 11 of the present invention comprises a first vertical support 13 and a second vertical support 15, spaced from the first support, joined together by a bottom member 17 to form a U-shaped frame 19 providing an unobstructed working area 21 between the spaced-apart vertical supports. It is in the working area 21 that the parting-off cut is made.

The rod length 3 from which the article 1 is made is supported by the automatic screw machine in its collet cap and extends through the first support 13 and across the working area 21. The free end of the rod length carries the finished article 1 which is held in the second support 15. Means are provided on the frame 19 for supporting the device in operative position in the automatic screw machine. Centering means 23 connected to the second support member 15 are provided for engagement with the turret 25 of the automatic screw machine. A pin 27 on the centering means engages a central hole 29 on the turret 25 to center the device. The turret 25, when moved toward the collet cap 31 of the machine, holds the device in frictional engagement therewith in an operative position.

The rod length with the article attached thereto extends freely through the first support 13. The first support 13 carries frictional drive means engaging the rotating collet cap 31 of the machine. The frictional drive means drives a gear train transmitting drive from the collet cap 31 through the frame 19 to means engaging the finished article 1 in the second support 15 to rotate the supported article at the same speed that the engaged rod length is driven by the automatic screw machine.

Figure 4:
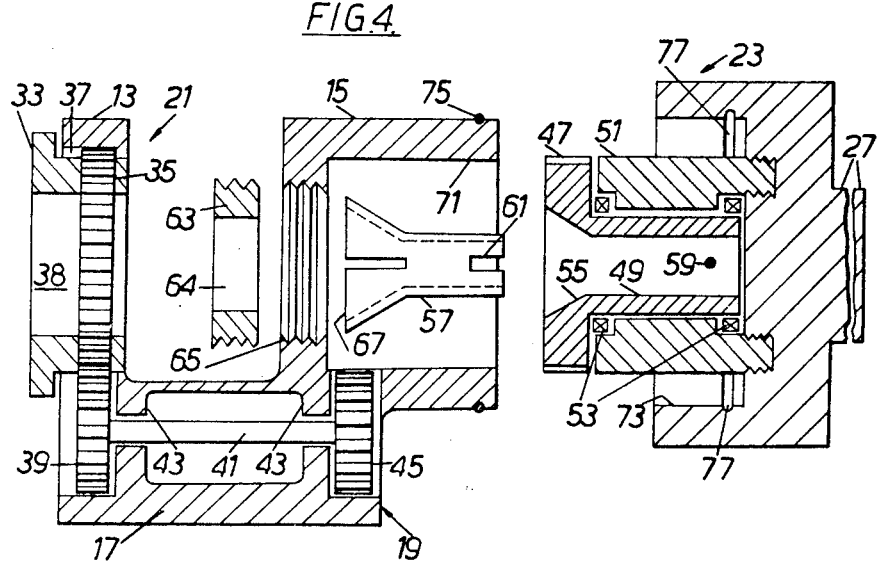
FIG. 4 is an exploded sectional view showing structural details of the parting-off device.

As shown in more detail in FIG. 4, the frictional drive means comprises a friction plate 33 extending from the first support to engage the collet cap 31. The plate 33 is connected to a first gear 35 rotatable in a well 37 in the first support member. Both the friction plate 33 and gear 35 have an axial aperture 38 permitting the rod 3 to pass through. The first gear 35 drivingly engages a second gear 39 located in the bottom support 17. The second gear is connected to a shaft 41 extending through the bottom support 17 and carried by bearings 43. A third gear 45 identical to the second gear 39 is connected at the other end of the shaft. The third gear 45 drivingly engages a fourth gear 47 identical to the first gear 35 located in the first support member. Thus the drive is transmitted from the face plate 31 of the automatic screw machine through the friction plate 33, the first 35, second 39, third 45 and fourth 47 gears to the opposite side of the parting-off box and around the unobstructed working area 21.

The fourth gear 47 is attached to a tubular support member 49 which is supported in the centering member 23 of the parting-off box. A collar 51 is attached to the centering member 23 for receiving the tubular support member 49 carrying the fourth gear 47. Bearings 53 permit the tubular support member 49, and thus gear 47, to rotate with respect to collar 51. The tubular member 49 carrying the fourth gear 47 has a conical or flared opening 55 for receiving a collet 57 which engages the end of the finished article extending across the unobstructed working area 21. The collet 57 is adjustable in size and slides into the tubular member 49 to lock onto the article. The collet 57 is prevented from rotating relative to the tubular member through a pin 59 and slot 61 connection. The collet 57 receives the end of the article and adjustably clamps on it by means of a locking collar 63 which can be screwed into a central aperture 65 in the second support member 15. The article passes through a central aperture 64 in the collar 63. The locking collar 63 bears against the end edge 67 of the collet and as it is moved toward the collet, it forces the collet into the conical opening 55 and thus clamps the collet against the article located within it to engage the article frictionally.

The second support member 15 has an integral tubular sleeve 71 extending therefrom which slides over the gear 47, the tubular support 49 and the collar 51 and within an integral sleeve 73 on the centering member 23. The support member 15, and thus the frame 19, is detachably connected to the centering member 23 by a snap ring 75 on the sleeve 71 fitting into a groove 77 in the sleeve 73.

With the collet 57 frictionally holding the article and located and held by the tubular member connected to the fourth gear 47, the article will be rotated at the same speed of rotation as the rod length, extending out from the collet cap of the machine, is rotated by the machine.

The unobstructed working area 21 permits the parting-off cut to be made between the article and the rod length as shown in FIG. 2 by the parting-off tool 69. When the cut is finished the article is still held and rotated in the collet and does not drop off. Thus no projection is formed on either the end of the rod length or the finished article and no further operation is required to finish the article. (The article, after the cut is made, is automatically ejected from the collet 57 in the box 11.)

The collet 57 can be provided in different sizes to receive different sizes of finished articles.

We claim:

1. A device for use with a single-spindle turret-type, automatic screw machine, said device including means to support and rotate at the same speed as the machine and during the entire parting-off cut a finished article formed on the end of bar-stock projecting from the bar-stock holding member of the machine, said means comprising a support frame to be supported by the turret of the machine for movement towards and away from said bar-stock holding member and having a through-opening for free passage of bar-stock projecting from said member and a free space merging with said opening to provide an unobstructed working area for cutting off from said bar-stock, a finished article on the projecting end of said bar-stock, a collet located and supported by said support frame and adapted frictionally to engage said finished article on movement of said frame towards said bar-stock holding member, and frictional drive means carried by said frame to be engaged with said bar-stock holding member on movement of the frame theretowards, and gear means between said frictional drive means and said collet to rotate the latter at the same speed as said bar-stock when said frictional drive means is operative.

2. A device as set forth in claim 1, wherein a centering member is connected to said support frame and is engageable with the turret of the machine, a collar is attached to said centering member, said gear means includes a gear integral with a tubular support receivable in said collar, said collet is slidable into said tubular support, and means is provided to prevent relative rotation between said collet and said tubular support.

3. A device for use with a single-spindle, turret-type, automatic screw machine to enable clean separation of a finished article on the end of bar-stock projecting from the rotating bar-stock holding member of the machine, said device comprising first and second mutually-spaced upright support members interconnected by a bottom member to form a U-shaped frame providing an unobstructed working area between said support members, frictional drive means carried by said first support member to confront said bar-stock holding member when said U-shaped frame is operatively positioned, said first support member having therein an opening for through extension of the projecting end of the bar-stock, said second support member being adapted to be supported by the turret of the machine, a collet located and held by said second support member and adapted frictionally to engage the finished article when said turret is moved toward the bar-stock holding member of the machine to force said frictional drive means into frictional engagement with said bar-stock holding member, and a gear train between said frictional drive means and said collet to rotate said collet at the same speed as said bar-stock when a parting-off cut is being made in said unobstructed working area.

4. A device as set forth in claim 3, including a first sleeve integral with said second support member on the side of the latter remote from said working area, a centering member engageable with the turret of the machine and including a second sleeve within which said first sleeve is receivable and lockable, a collar attached to said centering member, a tubular member integral with a gear of said gear train and receivable within said collar, the bore of said tubular member being conically flared, bearing means permitting rotation of said tubular member relative to said collar, said collet being slidable within said tubular member and being lockable relative thereto, said second support member having therein a central tapped aperture, and a locking collar adapted to be screwed into said aperture to bear against said collet.

* * * * *